Dec. 20, 1932.   H. WILLSHAW   1,891,489
MANUFACTURE OF PNEUMATIC TIRE CASINGS AND APPARATUS THEREFOR
Filed Sept. 21, 1929   3 Sheets-Sheet 3

Inventor
HARRY WILLSHAW.
By His Attorneys

Patented Dec. 20, 1932                                                         1,891,489

UNITED STATES PATENT OFFICE

HARRY WILLSHAW, OF BIRMINGHAM, ENGLAND, ASSIGNOR TO DUNLOP RUBBER COMPANY LIMITED, OF BIRMINGHAM, ENGLAND

MANUFACTURE OF PNEUMATIC TIRE CASINGS AND APPARATUS THEREFOR

Application filed September 21, 1929. Serial No. 394,223.

This invention comprises improvements in or relating to the manufacture of pneumatic tyre casings and apparatus therefor and is particularly concerned with the method and apparatus of building up tyres in pulley band form.

One of the objects of this invention is to provide an improved device for rolling down the successive plies of a tyre casing when built up on the flat in the form of a pulley band. It is also applicable to the stitching of the tread across the casing.

The invention is applicable to that type of machine and apparatus wherein the casing is built up of successive plies upon a circular collapsible former which has a flat or approximately flat surface. In such machines the pressure to roll down the plies has been applied by cams and suitable linkage and the drum or former has been mounted in such a way that it is adapted to be rotated by power means.

A further object of this invention is to provide apparatus which is more wholly automatic than in known machines of this kind, and restrict the necessary manipulation of apparatus of the kind described in the invention to the initial actuation of a lever, whereby the mechanism is set in motion and completes the operation automatically without further attention, thereby facilitating production and obtaining a more uniform product with greater rapidity.

According to this invention we provide an apparatus for making tyres in band form comprising discs and mechanism actuated to bring such discs into working contact with the tyre material upon the drum, whereby the discs are rotated and are caused to traverse automatically across the width of the tyre material, together with automatic means for releasing such contact at the end of the traverse and automatic means for returning the discs out of engagement with the tyre fabric to their initial idle position, the said discs being rotated by contact with the drum independently of other means, and being preferably arranged to contact the tyre material with resilient pressure while moving from the centre towards the beads.

In order that our invention may be more easily understood and readily carried into practical effect, the same will now be described with reference to the accompanying drawings, in which:—

Figure 1:
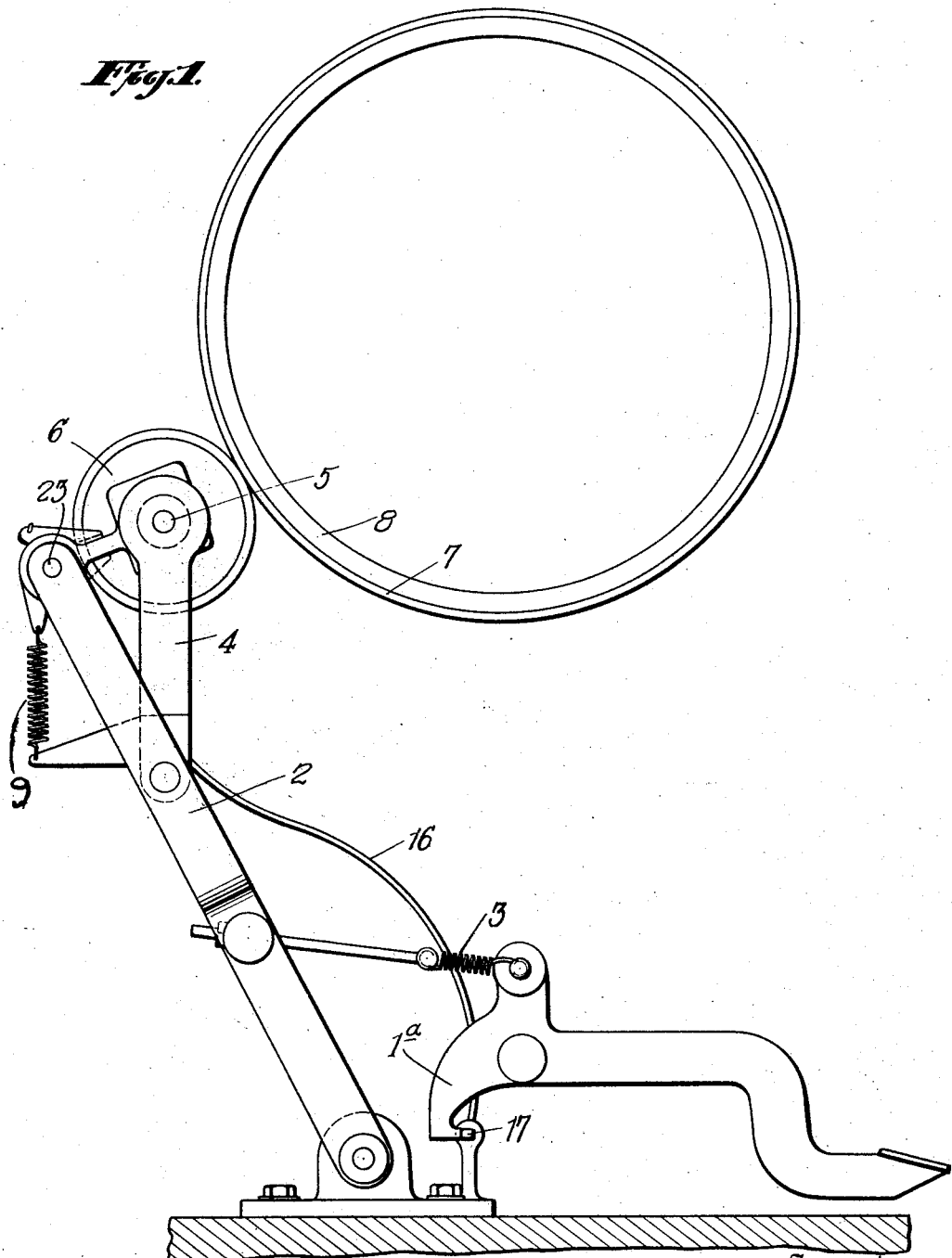
Figures 1 and 2 are respectively side and end elevations of the apparatus.

The operator depresses the pedal 1 which transmits a pull to the lever 2 through adjustable resilient means such as a spring 3, causing the arm 4 to carry the rotatable shaft 5 upon which are mounted the discs 6 into engagement with the plies or tread 7 of the tyre which have been assembled upon the drum 8.

The movement of the arm 4 extends the spring 9 thereby resiliently causing the release of the rolling discs from the tyre fabric at the end of each outward separation of the discs.

Figure 3:
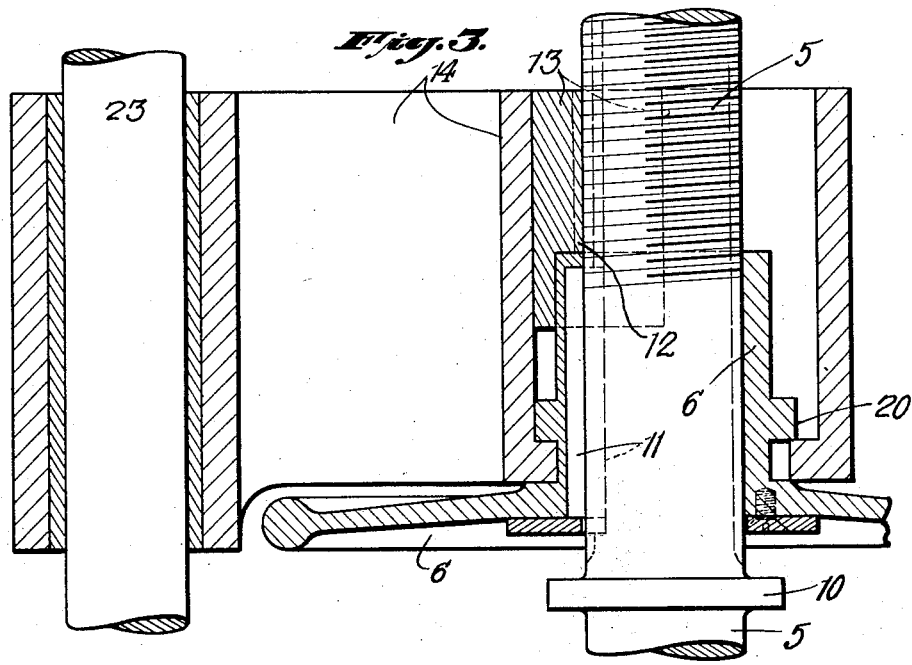
Figure 3 is a sectional plan of the bracket and shafts.

The shaft 5 is equally divided into a left-hand and a right-hand screw thread which may be of the kind known as the "acme", and has a central collar 10 Fig. 3 upon either side of which the rolling discs come to rest.

When the discs 6 contact the drum, which is suitably revolved in any convenient known manner, the rotation of the drum is transmitted by contact to the discs and by them in turn through the keyway 11, Fig. 3 to the screw-threaded shaft 5.

In Fig. 3 the shaft and associated parts are shown in their working positions. The screw threads of the rotating shaft 5 engage with complementary grooves 12 in the half nut 13, and as a similar nut is secured to each bracket 14 these brackets are traversed so as to separate outwardly and to carry the rotating discs so as to roll down the assembled tyre from the centre towards the beads.

The discs proceed outwardly until each bracket 14 or a contact arm attached thereto strikes the plunger 15 which causes a pull to be transmitted through the cable 16 to a catch 17 which is thereby withdrawn so as to release the pedal arm 1a, which allows the pedal to rise under the gravitational pull of the bracket and associated members in readiness for a further operation.

When initially depressed by the operator, the catch 17 is over-ridden by the arm 1a and prevents its return by reason of the spring 18.

Each bracket 14 has attached to it an arm 19 joined by a spring 21 to the member 2.

Figure 2:
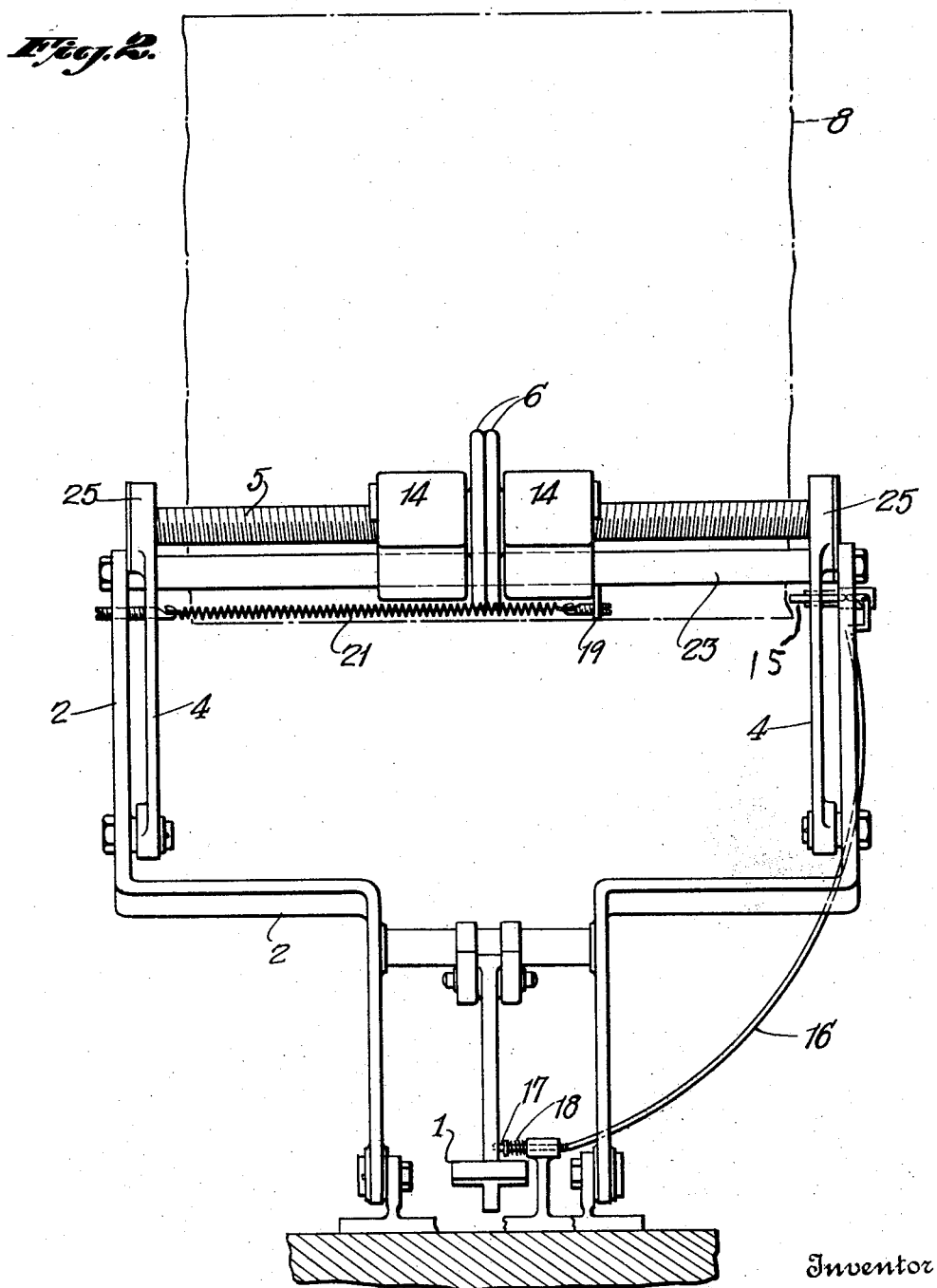

One only of these springs is shown in Fig. 2 but the other is attached in the same way to the remaining bracket so that the outward separation of the discs tensions the springs and when the plunger 15 is struck the brackets and shafts fall back sufficiently to clear the discs from the drum and to allow the spring 9 to cause the shaft 5 Fig. 3 to move towards the drum but without engagement therewith. The threaded shaft 5 is then pulled by the spring 9 away from the half nut 12 to a distance or clearance 20 sufficient to disengage the threads and allow the springs 21 to exert their pull to return the discs to the centre of the shaft.

Figure 4:
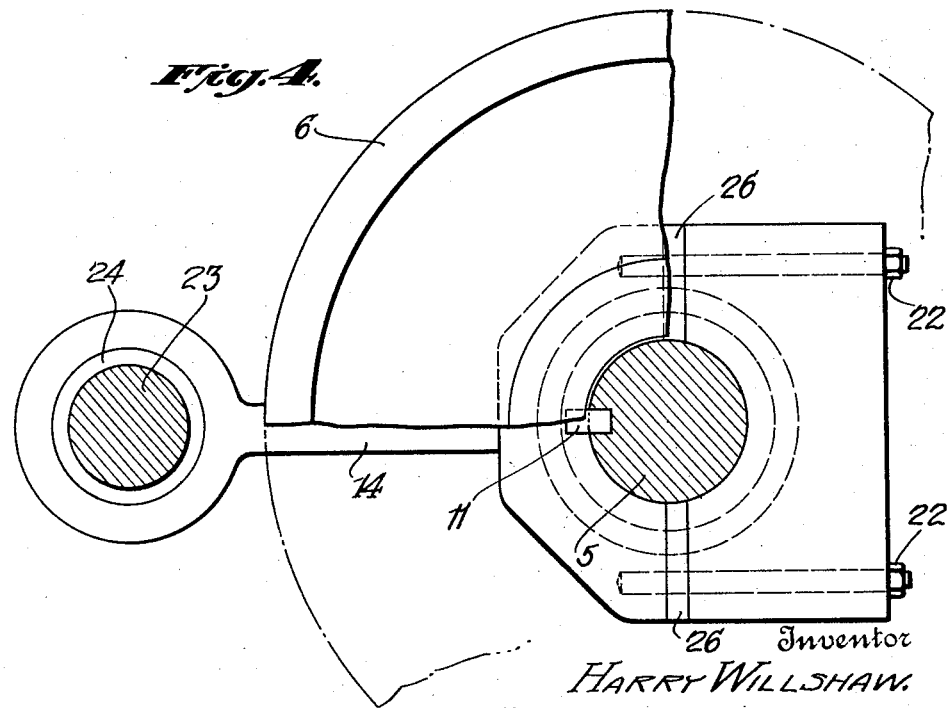
Figure 4 is an end view of the bracket and shafts shown in Fig. 3 showing part of one of the discs for rolling down.

The necessary clearance 20 is conveniently effected by a packing piece 26 Fig. 4 introduced between the faces of the brackets 14 which are clamped together by bolts 22. A plain shaft 23 acts as a longitudinal guide and pivot for one end of the bracket 14 which is bored and provided with a suitable liner 24 to move freely thereon. To reduce friction the ends of the shaft 5 are preferably provided with ball bearings housed within bearings 25.

Various modifications may be made by those skilled in the art without departing from the invention as defined in the following claims:

1. Tire making apparatus comprising a rotatable drum, separable discs, a guide rod, a pivoted arm carrying said rod, a pedal, a resilient connection from said pedal to said arm to swing said arm towards said drum when said pedal is depressed, a detent for retaining said pedal in depressed position, brackets on said rod carrying said discs, one for each disc, a right and left threaded screw shaft, and half nuts in said brackets resiliently pressed out of engagement with said screw shaft and moved into engagement therewith by reaction of said discs against said drum.

2. Tire making apparatus comprising a rotatable drum, separable discs, a guide rod, a pivoted arm carrying said rod, a pedal, a resilient connection from said pedal to said arm to swing said arm towards said drum when said pedal is depressed, a detent for retaining said pedal in depressed position, brackets on said rod carrying said discs, one for each disc, a right and left threaded screw shaft, half nuts in said brackets resiliently pressed out of engagement with said screw shaft and moved into engagement therewith by reaction of said discs against said drum, and means actuated by said discs at a determined point in their movement by said screw shaft to release said detent.

3. Tire making apparatus comprising a rotatable drum, a right and left threaded screw spaced lengthwise of said drum, discs slidable on said screw, one for said left threads and one for the right threads, half nuts engaging said discs, one for each disc supporting means for slidably supporting said discs against said drum, and movable radially thereto to engage the threads of said screw, means for resiliently drawing said half nut away from said screw threads, and means for bringing said half nut into engagement with said screw threads and resiliently pressing the edges of said discs against said drum, said discs being rotated by contact with the surface of said drum and being slidably keyed to their respective screws.

4. Tire making apparatus comprising a rotatable drum, a supporting shaft having right and left screw threads extending symmetrically from a central point, discs slidable on said screw, one for said left threads and one for the right threads, half nuts having a rotatable connection to said discs and engaging them in a longitudinal direction, one half nut for each disc, a shaft parallel to said threaded shaft for supporting said half nuts independently of said threaded shaft, resilient means for separating said shafts until said half nuts are out of engagement with said screw threads and permitting said half nuts to engage such screw threads when force is applied to the opposite edge of said discs.

5. Tire making apparatus comprising a rotatable drum, a pair of discs, a shaft for supporting said discs, means for supporting said shaft to swing it towards said drum and in parallel relation thereto, operating means for said shaft supporting means having a resilient connection thereto and a detent for holding said operating means in operating position, a screw and nut arrangement on said shaft to cause said discs to separate when rotated by contact with said drum and means to release said detent when said discs have separated to a predetermined distance and resilient means for drawing said discs together when released from said screw and nut connection.

6. Tire making apparatus comprising a rotatable drum, separable discs, a guide rod, a pivoted arm carrying said rod, means to swing and resiliently hold said arm and said rod toward said drum, a detent for retaining said arm toward said drum, brackets on said rod carrying said discs, one for each disc, a right and left threaded screw shaft, and half nuts in said brackets resiliently pressed out of engagement with said screw shaft and moved into engagement therewith by the reaction of said discs against said drum.

7. Tire making apparatus comprising a rotatable drum, separable discs, a guide rod, brackets on said rod carrying said discs, one for each disc, a pivoted arm carrying said rod, means to swing and resiliently hold said arm toward said drum pressing said discs against said drum, a right and left threaded screw shaft, half nuts in said brackets resiliently pressed out of engagement with said screw shaft and moved into engagement therewith by reaction of said discs against said drum, and means actuated by the separation of said discs to a predetermined position to release said arm holding means.

In witness whereof, I have hereunto signed my name.

HARRY WILLSHAW.